US008686877B2

(12) United States Patent
Madhav

(10) Patent No.: US 8,686,877 B2
(45) Date of Patent: Apr. 1, 2014

(54) DIRECTIONALLY FILTERED INDICATOR LIGHT

(75) Inventor: Jagdish T. Madhav, Bothell, WA (US)

(73) Assignee: The Boeing Company, Chicago, IL (US)

(\*) Notice: Subject to any disclaimer, the term of this patent is extended or adjusted under 35 U.S.C. 154(b) by 80 days.

(21) Appl. No.: 13/533,491

(22) Filed: Jun. 26, 2012

(65) Prior Publication Data

US 2013/0342371 A1    Dec. 26, 2013

(51) Int. Cl.
*G08B 21/00*    (2006.01)

(52) U.S. Cl.
USPC ........... 340/945; 340/953; 340/955; 340/965; 362/231; 362/470; 362/471

(58) Field of Classification Search
USPC .......... 340/945, 953, 955, 965; 362/231, 470, 362/471
See application file for complete search history.

(56) References Cited

U.S. PATENT DOCUMENTS

| 7,355,161 B2* | 4/2008 | Romig et al. ............. 250/221 |
| 7,534,016 B2* | 5/2009 | Stavaeus et al. ............. 362/471 |
| 2008/0055731 A1 | 3/2008 | Boston et al. |
| 2008/0066971 A1 | 3/2008 | Whang et al. |

OTHER PUBLICATIONS

3M Optical Systems Division, Specialty Display Products; Customer Quality Specification; "Advanced Light Control Film BR0 60' (ALCF-P ABR0 60');" Sep. 11, 2008; pp. 1-6.
3M Optical Systems Division, Integrated Optical Products; Customer Quality Specification; "Vikuiti (TM), Advanced Light Control Film ABR2 Anti-glar 60' (ALCF-P ABR2 Anti-glare 60');" Apr. 25, 2005; pp. 1-6.

\* cited by examiner

*Primary Examiner* — Tai T Nguyen
(74) *Attorney, Agent, or Firm* — Parsons Behle & Latimer

(57) ABSTRACT

The present disclosure provides a directionally filtered indicator light, wherein a directional filter is applied to a light source that is controlled to emit light when a condition or series of conditions are met. The directional filter, in turn, regulates the transmission of light from the light source so that a first group of individuals, located within a viewing angle, are the only individuals able to see the transmitted light. In one example, the directionally filtered indicator light of the present disclosure allows an indicator light on the interior of a passenger aircraft to be viewed from outside the aircraft in direct sunlight while substantially eliminating the presence of transmitted light from a passenger seating area.

20 Claims, 4 Drawing Sheets

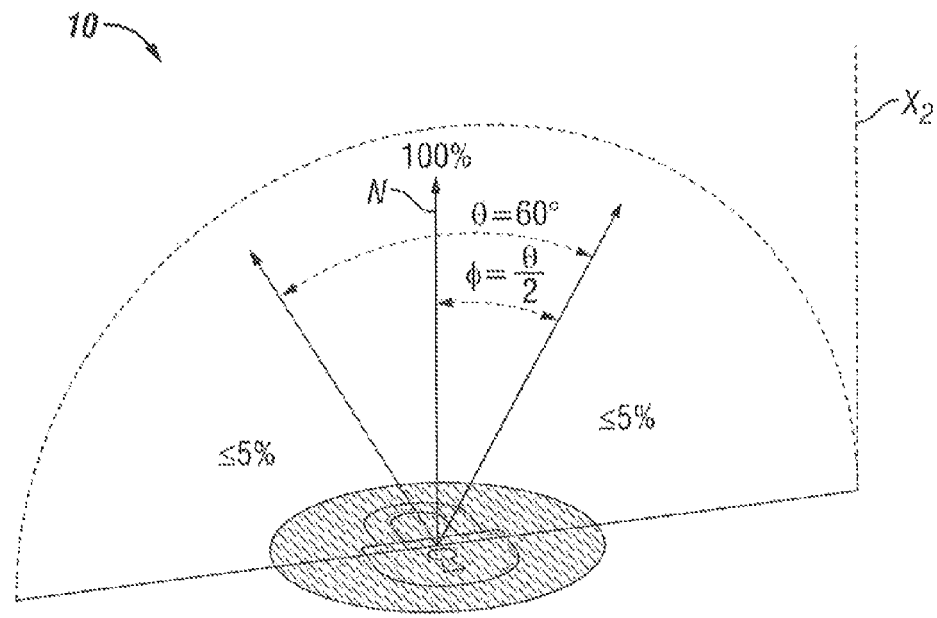
FIG. 5
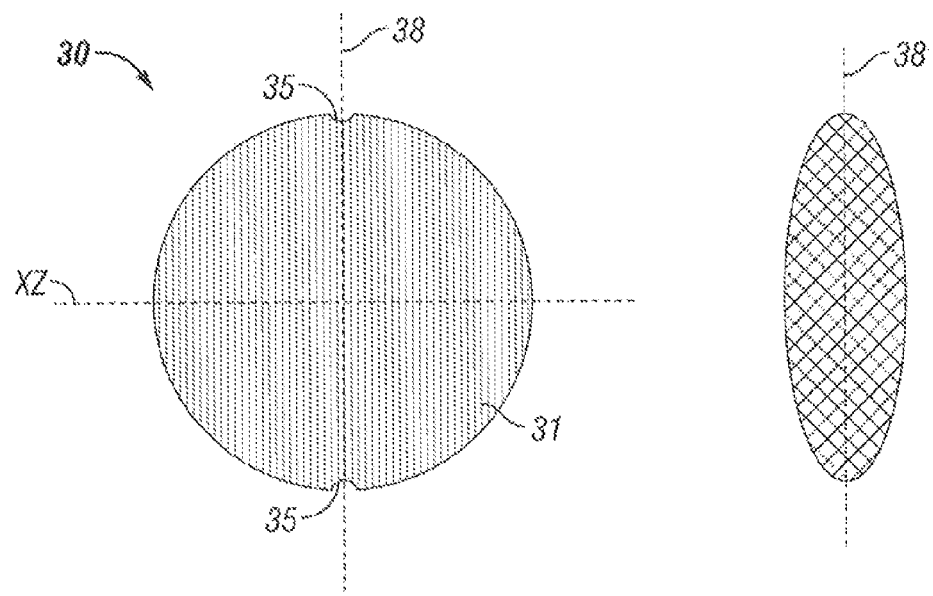
FIG. 6A  FIG. 6B

DIRECTIONALLY FILTERED INDICATOR LIGHT

FIELD

The present disclosure relates to device and method for providing a directionally filtered light source, and more particularly relates to a device and method for directionally filtering an indicator light within a passenger vehicle, such as a passenger aircraft.

BACKGROUND

Passenger aircrafts are designed to meet numerous safety guidelines and regulations. These requirements are designed to ensure the general safety of passengers and crew. For example, current U.S. regulations relating to fuselage passenger entry doors include requirements that all such doors remain closed, latched, and locked and that an individual lock is provided for each door latch. The regulations further require that each door have a means for direct visual inspection to determine, without ambiguity, if the door is fully closed, latched, and locked. This means for visual inspection is required to be discernible from various viewing angles under operational lighting conditions, which may include light sources as varied as, for example, direct sunlight and a flashlight.

Often, such safety requirements may pose a nuisance to the passengers or crew of the aircraft. In some cases, methods for complying with these regulations require additional labor to be performed by the service crew. In other instances, safety regulations subject the passengers to noise or light disturbances. For example, the requirement for a visual inspection means of the closed, latched, and locked conditions of fuselage doors is typically met using mechanical means, such as a lever arm, the position of which indicated the status of a particular door. The lever arm is a relatively simple mechanism, but still requires the action of the crew to report its status and further adds the weight of the mechanism at each door to the overall weight of the aircraft.

SUMMARY

The present disclosure provides a directionally filtered indicator light system and method which fulfills the current need for providing a visual inspection means that is reduces the labor required and minimizes the potential nuisance to passengers and crew. The system of the present disclosure comprises an indicator light that is visible to a first group of individuals in a first location and is not visible to a second group of individuals in a second location. In some embodiments, for example, the directionally filtered indicator light is configured to meet safety guidelines and regulations for passenger aircraft, allowing an indicator light in the window of a passenger entry door to be discernible by an individual from outside of the aircraft while preventing that same light from disturbing the nearby passenger seating area, particularly during times of darkness or sleep.

Various aspects of the present disclosure provide a method and device for limiting the apparent intensity of an indicator light. The indicator light may be provided according to specification for a particular use, or may be provided as having already been installed in an environment. A directional filter is provided in approximately the same size and shape of a display surface of the indicator light. The directional filter is placed on top of the display surface using, for example, an adhesive layer. The orientation of the directional filter is arranged so that the device of the present disclosure regulates the transmission of light to discriminate between two or more locations or two or more groups of individuals. The indicator light system and method of the present disclosure allows an observer to discern the status of the indicator light from outside a controlled environment, even in the presence of direct sunlight or other conditions of bright light.

Other systems, methods, features, and advantages of the present disclosure will be or become apparent to one with skill in the art upon examination of the following drawings and detailed description. The features, functions and advantages that have been discussed can be achieved independently in various embodiments of the present invention or may be combined in yet other embodiments further details of which can be seen with reference to the following description and drawings.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 is a diagram demonstrating the manner in which the light is filtered along an orthogonal plane according to one embodiment of the present disclosure;

FIGS. 6A and 6B are illustrations of a light control film prepared in accordance with one embodiment of the present disclosure.

DETAILED DESCRIPTION

In the following description, reference is made to the accompanying drawings, which form a part hereof, and in which is shown, by way of illustration, various embodiments of the present disclosure. For example, while the discussion below focuses on the example of an indicator light located in or near the window of the passenger entry door of an aircraft, the disclosure and its various embodiments are not limited to such use. It is understood that other embodiments may be utilized and changes may be made without departing from the scope of the present invention.

Figure 1:
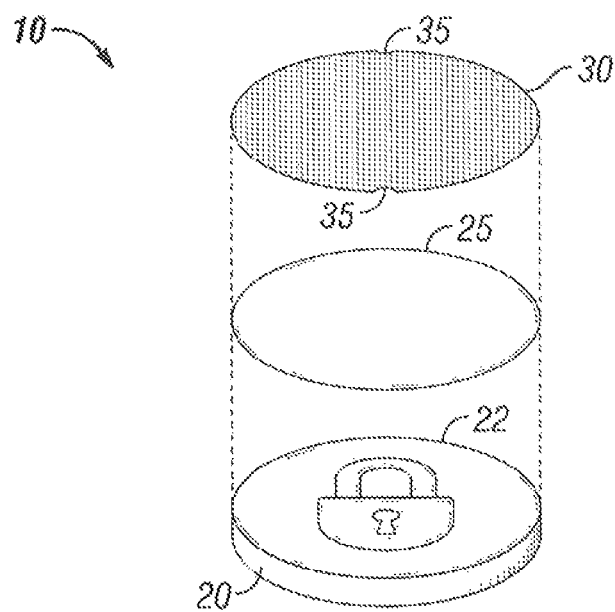
FIG. 1 is an exploded representation of a directionally filtered indicator light according one embodiment of the present disclosure.

FIG. 1 illustrates one embodiment of a directionally filtered indicator light 10 according to one embodiment of the present disclosure. In the illustrated embodiment, the directionally filtered indicator light 10 comprises a light source 20 in combination with a directional filter 30. The light source 20 further comprises a display surface 22, which may comprise, for example, an image. In some embodiments, the directional filter 30 comprises a light control film. The directional filter 30 further includes orientation marks 35, which may take the form of indentations, as shown in the illustrated embodiment of FIG. 6A. The directional filter 30 is arranged adjacent to the display surface 22 of the light source 20. In the illustrated embodiment, the directional filter 30 is placed directly on the display surface 22 using an adhesive layer 25.

Figure 2:
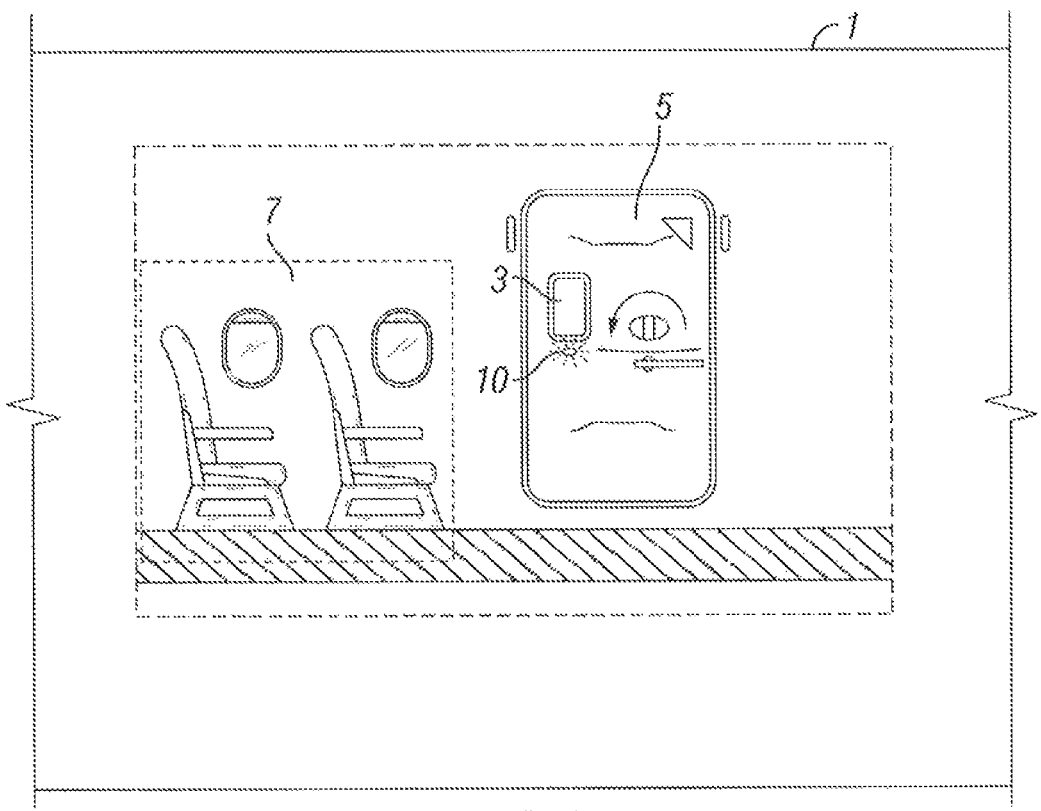
FIG. 2 is a partially sectioned illustration of a directionally filtered indicator light installed within a passenger aircraft according to one embodiment of the present disclosure.

FIG. 2 illustrates a passenger aircraft 1, in which the directionally filtered indicator light 10 is installed, according to an embodiment of the present disclosure. In the illustrated embodiment, the passenger aircraft 1 comprises a passenger entry door 5 having a window 3, and a passenger seating area 7. As shown in FIG. 2, the directionally filtered indicator light 10, which comprises a "Closed/Latched/Locked" indicator, is installed on the passenger entry door 5 near the window 3. In some embodiments, the directionally filtered indicator light 10 is secured into place by a retaining ring (not shown). Because of the spatial constraints of aircraft design, the directionally filtered indicator light 10 is in the immediate vicinity of the passenger seating area 7. However, the directionally filtered indicator light 10 advantageously emits approximately no light that is directly visible from the passenger seating area 7, even though the location of the indicator light 10 is otherwise visible to said passenger seating area 7. The flight attendant, at conclusion of boarding, will have no problem viewing the indicator light 10 during closing and locking of the passenger entry door 5. A flight coordinator standing outside the passenger entry door will get confirmation of the door getting locked when the indicator light 10 is turned ON and is visible through window 3, even in the presence of bright ambient light, such as under conditions resembling direct sunlight at noon on a clear day.

Figure 3:
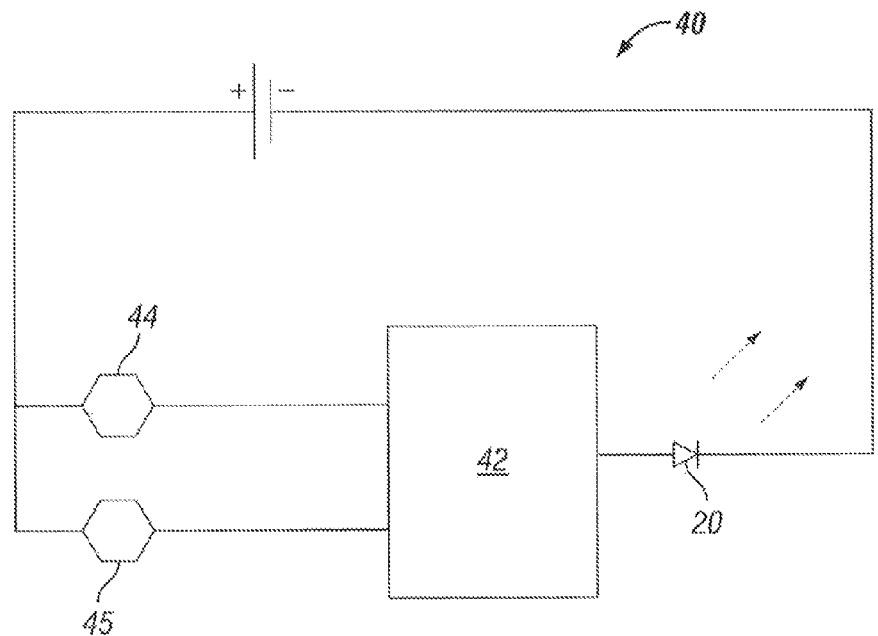
FIG. 3 is a schematic of a control system for a directionally filtered indicator light in accordance with the present disclosure.

FIG. 3 illustrates one embodiment of a control system 40 that may provide command and power signals to the directionally filtered indicator light 10 when in use. In the illustrated embodiment, the control system 40 comprises a "door closed" sensor 44 and a "door locked" sensor 45 coupled to a logic controller 42, which is in turn coupled to a light source 20. In some embodiments, the logic controller 42 comprises a computer processor, one or more logic gates, or the like. The control system 40 may also be connected to an Emergency Power Assist System (EPAS) module of the passenger aircraft 1. In operation, when the "door closed" sensor 44 and the "door locked" sensor 45 are both closed, logic controller 42 sends power to the light source 20, which is shown as a Light Emitting Diode (LED) in the illustrated embodiment.

According to the present disclosure, the light source 20 may be chosen from any number of suitable light sources. In some embodiments, the light source 20 shown in FIG. 3 may be an LED light source, which advantageously exhibits relatively long life and reliability, both of which are significant considerations when used as an aircraft component. In other embodiments, the light source 20 may comprise LCD, incandescent, fluorescent, or any other suitable source of light. The display surface 22, may be chosen from any number of available materials and shapes, which may correspond to the type of light source 20 chosen. Alternatively, the directionally filtered indicator light 10 may be employed in connection with a wide variety of control systems, which, for example, supply power when a particular condition or set of conditions are met.

Figure 4A:
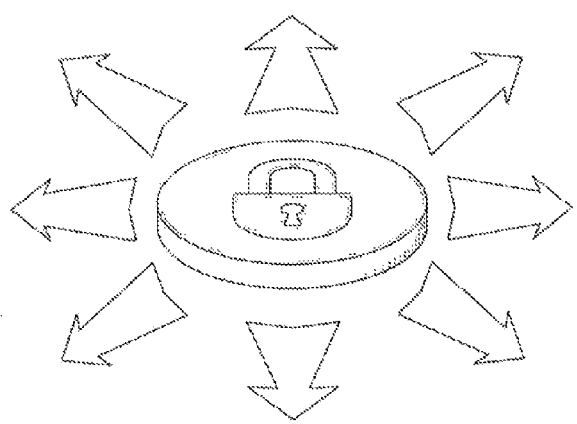
FIGS. 4A and 4B are illustrations of one embodiment of the present disclosure comparing, respectively, the light emitted by the indicator light with and without a directional filter.
Figure 4B:
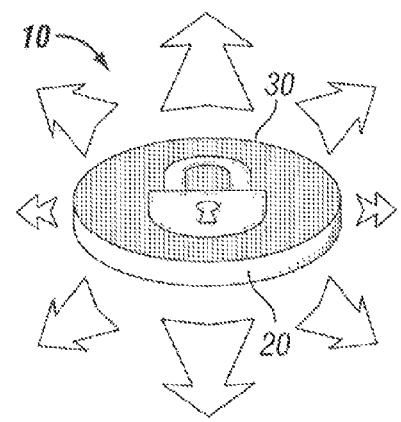

In operation, the directional filter 30 operates to prevent the light emitted by the light source 20 from being transmitted outside of a selected trajectory range or viewing angle. As illustrated in FIG. 4A, the light from the light source 20 alone is transmitted in all directions. In comparison with FIG. 4B, however, where the directional filter 30 is placed over the light source 20, the light emitted by the directionally filtered indicator light 10 is substantially constrained to the right and to the left of the light source 20. At the same time, the light is relatively unconstrained above and below the indicator light 10, as shown by the arrows, as well as being highly visible in the normal direction (perpendicular to the display surface).

As stated above, in some embodiments the directional filter 30 comprises a light control film, which may be selected from a number of available materials, including, for example, VIKUITI™ light control films manufactured by 3M™ Optical Systems. These and similar light control films operate like a set of fixed louvers embedded in a structure such as, for example, a polycarbonate film. When placed over a display surface or image, the display or image appears unobstructed at normal incidence (viewing angle=0°; perpendicular to the light control film), but as the viewing angle increases along an orthogonal plane the amount of light transmitted through the film decreases until reaching a cutoff angle where the film blocks approximately all of the transmitted light.

In some embodiments, the directional filter 30 may comprise an optical device which performs similar functions to those described above, such as a cylindrical optical lens or a Fresnel cylindrical lens. The selection of an appropriate lens, including the appropriate specifications, may be accomplished by those with skill in the relevant art in view of the present disclosure.

As explained in U.S. Patent Publication 2010/0271721, the disclosure of which is incorporated herein by reference in its entirety, light control films are designed to regulate light transmission to fall within or without a specific viewing angle $\theta$. In the embodiment illustrated by FIG. 5, the viewing angle $\theta$ of the light control film is about 60°; i.e., the image underlying the light control film is viewable within in a 60° range, or within an angle $\phi$ of about ±30° (plus or minus about 30°), along orthogonal plane XZ. At the normal incidence N, perpendicular to the directional filter 30, the indicator light 10 of the illustrated embodiment emits 100% of the available maximum light transmitted through the directional filter. Outside of the viewing angle, however, the directionally filtered indicator light of the present embodiment emits no more than about 5% of the maximum light transmitted in the normal direction N. Light control films are also commonly designed with a viewing angle of 48°. Many other trajectory ranges are possible, and some embodiments of the present disclosure contemplate viewing angles of about 40° to about 60°, though some embodiments may require other viewing angles to receive consideration. The chosen viewing angle for some embodiments may, for example, be selected to consider the location of the indicator light with respect to the passenger seating area of a vehicle, which may be a passenger aircraft, or the relative position of a security system to a public walkway or metal detector.

As discussed above, light control films are generally constructed to regulate the emission of light along a plane that is orthogonal to the display surface 22. In alternative embodiments, however, the light control film may be constructed to regulate transmission of light in multiple planes. For example, a light control film could be constructed that would allow the directionally filtered indicator light to be viewed from a range of about 48°, within a first plane that is orthogonal to the display surface 22, and within a range of about 60° along a second plane that is orthogonal to both the display surface 22 and the first plane. It may also be possible to define the viewing angle in terms of a polar coordinate system or other coordinate system.

Another aspect of the present disclosure provides a method for arranging the directional filter 30 on the display surface 22 of the light source 20, wherein the directional filter 30, such as a light control film, is cut to a size and shape that approximates the size and shape of the display surface 22. Further, as seen from the embodiment illustrated in FIG. 6A, the properly sized directional filter 30 may also be prepared with orientation marks 35, such as indentations or the like, to indicate, for example, the direction of the orthogonal plane in which the light transmission is regulated by the directional filter 30. In the illustrated embodiment, the film is prepared with orientation marks 35 at the top and the bottom of the directional filter 30, which are intended to indicate to the individual or machine performing the installation that the orthogonal plane XZ in which light is regulated runs perpendicular to an axis 38 running between the orientation marks 35, as well as perpendicular to the display surface 22. This may facilitate proper alignment of the directional filter 30 in instances in which the orientation of the individual 'louvers' 31 may not be visibly apparent to the individual or machine handling the directional filter 30. Thus, by turning the directional filter 30 about on the axis 38 to an angle outside the viewing range θ, light passing through the film is substantially eliminated.

A directional filter 30 that has been prepared with orientation marks 35, according to the aspect of the disclosure above, is in some embodiments retrofit to a previously installed light source 20 and display surface, such as for example in the passenger entry door 5 of an aircraft 1, as shown in FIG. 2. The directional filter with orientation marks 35 may be applied using an adhesive layer 25 placed between the directional filter 30 and the display surface 22.

Figure 7A:
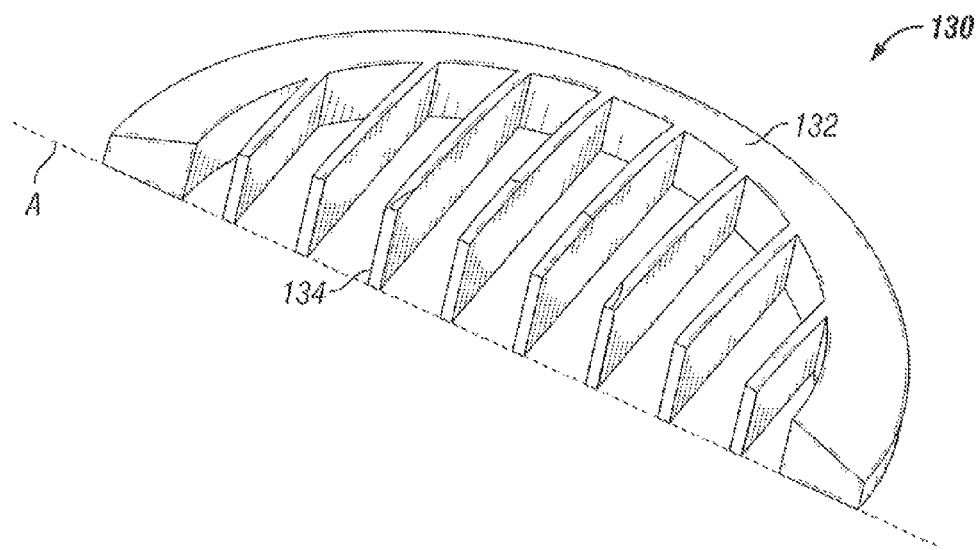
FIGS. 7A and 7B are two sectioned views of a light cover in accordance with another embodiment of the present disclosure.
Figure 7B:
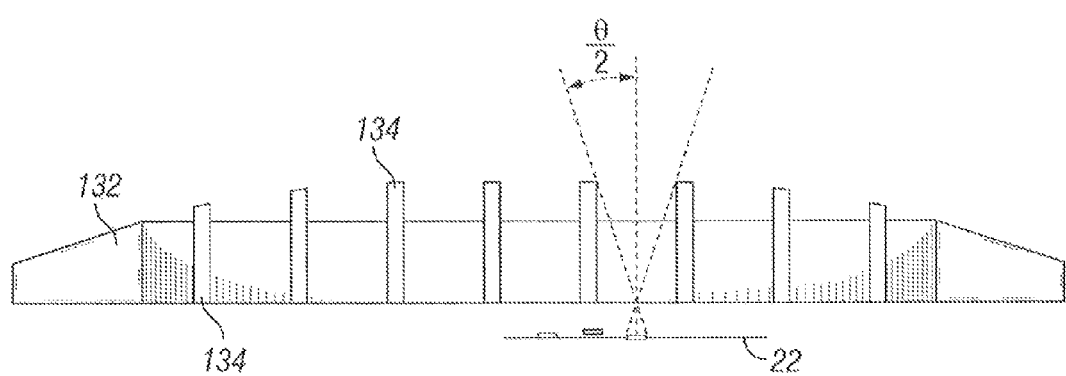

FIGS. 7A and 7B illustrate another embodiment of the present disclosure, in two respective views of a cross-section, wherein the directional filter 30 is comprises a light cover 130. Light cover 130 is a mechanical structure used to regulate light transmission. The light cover 130 is comprised of a plurality of mechanical louvers 134 arranged in a frame 132 of a light cover 130, the frame and the mechanical louvers approximating the two or three dimensional shape of the display surface 22. The light cover regulates light in a manner similar to that of the light control film, wherein the dimensions and spacing of the mechanical louvers may be selected to result in a desired trajectory range of transmitted light. For example, the illustrated embodiment shows an angle θ/2 of approximately 30°, which corresponds to a viewing angle θ of approximately 60°. In some examples, the mechanical louvers 134 may comprise a light absorbing surface to prevent the transmitted light from being reflected, thereby illuminating an area outside of the viewing angle. An adhesive layer 25 may be used in connection with the light cover 130 as with the light control film discussed above.

In yet other embodiments, the directionally filtered indicator light 10 may be used in connection with other passenger vehicles, security systems, or any other open or controlled environment, such as for example, where the indicator light 10 is relevant to a first group of individuals, or first location, and where the indicator light could present a nuisance or a security issue if the indicator light became visible to a second group of individuals, or second location. The first group of individuals may, for example, represent individuals with service or security responsibilities for those in the second group. Alternatively, for example, the directionally filtered indicator light 10 may be applied to individual indicator lights that are relevant to a single passenger of an aircraft and service personnel, without disturbing the remaining passengers.

It should be emphasized that the above-described embodiments of the present apparatus and process are merely possible examples of implementations and merely set forth for a clear understanding of the principles of the disclosure. Many different embodiments of the disclosure described herein may be designed and/or fabricated without departing from the spirit and scope of the disclosure. All these and other such modifications and variations are intended to be included herein within the scope of this disclosure and protected by the following claims. Therefore the scope of the disclosure is not intended to be limited except as indicated in the appended claims.

The invention claimed is:

1. A directionally filtered indicator light system, comprising;
   a light source having a display surface;
   a control system, the control system providing power to the light source when a condition or set of conditions are met;
   a directional filter arranged adjacent to the display surface such that the light source transmits light through the directional filter;
   wherein the directional filter regulates a transmitted light to within a viewing angle in at least one orthogonal plane; the viewing angle having been selected to permit a first location to receive the light transmitted by the light source and to prevent a second location from receiving the light transmitted by the light source.

2. The system of claim 1, wherein the directional filter is a light control film.

3. The system of claim 1, wherein the directional filter is a light cover having mechanical louvers.

4. The system of claim 1, wherein the directional filter is a cylindrical optical lens or a Fresnel cylindrical lens.

5. The system of claim 1, wherein the directionally filtered indicator light is located in a controlled environment.

6. The system of claim 5, wherein the controlled environment is a passenger vehicle, and wherein the second location is a passenger seating area.

7. The system of claim 6, wherein the passenger vehicle is a passenger aircraft, and wherein the first location includes an area outside of the passenger aircraft.

8. The system of claim 7, wherein the light source is installed adjacent to a window in a passenger entry door.

9. The system of claim 5, wherein the directional filter is oriented to allow the transmitted light to be received and recognized from outside the controlled environment in the presence of bright ambient light.

10. The system of claim 5, wherein the directional filter is oriented to prevent the transmitted light from being received in the second location during times of darkness.

11. The system of claim 1, wherein the viewing angle is between about 40° and about 60°.

12. A method for limiting an apparent intensity of an indicator light, comprising;
   providing an indicator light having a display surface with a known size and shape;
   preparing a directional filter with approximately the size and the shape of the display surface;
   determining an orientation of the directional filter; and
   arranging the directional filter adjacent to the display surface, wherein the orientation of the directional filter allows the indicator light to transmit light to a first group of individuals and substantially prevents the indicator light from transmitting light to a second group of individuals.

13. The method of claim 12, wherein the step of forming the directional filter further includes placing orientation marks on the directional filter; and wherein the step of determining the orientation of the directional filter includes observing the orientation marks.

14. The method of claim 12, wherein the indicator light is provided having been installed in a controlled environment.

15. The method of claim 14, wherein the controlled environment is a passenger aircraft.

16. The method of claim 15, wherein the indicator light is provided adjacent to a window in a passenger entry door.

17. The method of claim 12, wherein the step of arranging the directional filter is performed by placing the directional filter on the display surface by using an adhesive layer.

18. The method of claim 12, wherein the directional filter is arranged so that the light transmitted by the indicator light may be discerned by the first group of individuals in the presence of bright ambient light.

19. The method of claim 12, wherein the directional filter is a light control film.

20. The method of claim 12, wherein the directional filter is a light cover having mechanical louvers.

* * * * *